3,158,462
FUNGISTATIC NON-CAKING, SUBSTANTIALLY DUST FREE, WATER LEACHABLE FERTILIZER
Wilbert Moody Wilson, Morristown, N.J., assignor to George W. Helme Company, Helmetta, N.J.
No Drawing. Filed June 24, 1963, Ser. No. 290,159
2 Claims. (Cl. 71—4)

This invention relates to a novel fertilizer composition and to the method of making said composition.

Some of the disadvantages of modern granulated fertilizers are: (a) dusting effect, (b) caking effect and (c) the rapid leaching effect.

Thus modern fertilizers contain many so finely divided particles as to constitute a nuisance in that they give clouds of dusty particles when handled or spread upon the fields.

These finely divided particles are in large measure a cause of caking, especially under hygroscopic conditions, so that the fertilizer becomes lumpy and unfit for spreading through apparatus designed for free flowing substantially uniformly sized granules.

The last listed above disadvantages of modern fertilizers is that they are leached too rapidly into the soil so that the plants absorb the nutrients within a short space of time thus leading to growth in spurts. Whereas what is desired is a metered or gradual solution of the soluble fertilizer components of the granules thereby giving the plants a sustained and uniform growth rate.

Various means have been attempted to accomplish simultaneously these three desired results. However, such attempts have been disappointing in that while one or two of these disadvantages was removed the third disadvantage persisted.

Thus, for example, the use of material such as stearic acid or diatomaceous earth, etc., while assisting the free flowing and non-caking quality of the granules did little to help uniform feeding of the plants by uniform solution of the solubles in the granules.

It is an object of this invention to provide a novel fertilizer.

It is another object to provide a novel method of coating fertilizer granules.

It is a further object to provide an inexpensive substantially dust free and non-caking fertilizer having an excellent and uniform rate of solubility in moist soil as to feed plants over a long period of time.

These and other objectives of this invention will become apparent upon reading the following descriptive disclosure.

According to this invention residue still bottoms obtainable from the plastic industry in the manufacture of, for example, polystyrene polymers were found to provide excellent coatings for fertilizer granules and simultaneously eliminating the three above enumerated disadvantages of modern fertilizers.

These still bottoms are viscous liquids which are soluble in specific organic solvents. They also contain a considerable amount of unpolymerized material plus a substantial amount of polymerized resins. Preferably these still bottoms contain a vinyl group.

In preparing a solution for coating fertilizer granules, a solution which will deposit a monomolecular layer or coating is desired. Such a monomolecular layer, when of the optimum characteristics, will yield a controlled release of the water soluble plant food ingredients to the soil and the plant.

In short, the resin coating functions as a barrier having a uniform rate of passage of solubles therethrough.

About twenty pounds of resin per ton of fertilizer is required. Clearly where the resin is expensive, it is not economically feasible to use it on so cheap a product as fertilizer.

The film formed by the still bottoms of this invention over the fertilizer particles are of a hydrophobic nature and so are not attacked by moisture to any marked degree. In short, they resist rupture and disintegration with passage of time in the soil. The resin in other words functions so as to coat the particles of fertilizer with a skin or glove which skin persists on the granules until after substantially all the water soluble material has been leached out, a time interval of two years or two growing seasons.

An important feature of these still bottoms is that they contain unpolymerized material which is in part polymerized during the spraying of the solution on the fertilizer particles and in part polymerized while in the soil and under atmospheric conditions. The still bottoms often contain sulfur, for example, the sulfur present in the still bottoms obtained from the manufacture of ethyl benzene. As a general rule about 6 to 8 percent sulfur is present in these still bottoms, and the amount of polymerizable styrene therein amounts to from about one to about twelve percent.

The mode of coating the granules is to spray coat the granules while the granules are in an agitated state as in a ribbon mixer. The spray of still bottoms may be of the hot still bottoms or with a solution of still bottoms in a suitable organic solvent. The mixing or tumbling of the granules is continued until a uniform substantially monomolecular layer is deposited on the particles of fertilizer.

Still bottoms obtainable from vinyl polymerization reactions using boron trifluoride catalyst are desirable since the catalyst effects an in situ polymerization of the coating on the acidic fertilizer granules.

The plastic coated granules of this invention perform their function as sheaths to permit uniform leaching of water soluble plant food nutrients while also aiding the soil to keep a loamy texture. Thus the resin coated particles prevent clay type soils from drying out and cracking up as pottery like flakes at all times, i.e., even after the fertilizer components are all leached away.

In short, the granules of this invention functions chemically to yield plant nutrients and physically to obtain and maintain a stable loamy soil.

A partial analysis of several still bottom compositions of this invention yields the following data:

| | Percent by weight |
|---|---|
| Styrene | 2 to 20 |
| Polystyrene | 20 to 55 |
| Total sulfur | 6 to 30 |
| Anthracene | Less than 1 |

The polymerization of the residual styrene on the fertilizer granules may be hastened by the use of dryers such as nickel naphthenate.

Preferably the resin composition containing the naphthenate is air-blown to effect a seventy-five percent polymerization of the monomer, the remaining twenty-five percent of polymerization being effected at normal atmospheric temperature and pressure conditions on the fertilizer granule.

The boiling point of the still bottom residues varies between about 187° F. to about 300° F. or more.

Preferably the material is sprayed onto the granules at about 200° F.

The acidic fertilizer functions as a catalyst for the film on the granules.

However, boron trifluoride may be used to hasten or catalyze polymerization of the film on the coated granules, if desired.

A solvent may be used for the still bottoms, and preferably it is a synthetic petrochemical having unsaturated bonds in the molecules.

The presence of sulfur in the still bottoms makes the material fungistatic, which fungicidal property is enhanced by the presence of anthracene and like compounds in the residue still bottoms. The still bottoms may be used as such or they may be mixed with added commercial grade monomeric styrene, where desirable.

Preferably, twenty to thirty pounds of styrene type still bottoms per ton of fertilizer gives optimum results. But this amount may be varied due to soil conditions. Thus clay type soils may require a different amount of resin than would a loam type soil.

In applying the liquid resin to the fertilizer granules use is made of conventional mixers such as the horizontal continuous flow ribbon blade mixers. The liquid resin is sprayed onto the fertilizer at the inlet end or orifice and is thoroughly mixed within the fertilizer by the time it flows over the weir at the outlet end or orifice.

Still bottoms from the polystyrene plastic industry is available in huge quantities at minimal cost.

This material according to this invention was found to be ideal for coating fertilizer granules to effect a metered leaching of the water soluble fertilizer components therethrough. And besides these residues, have natural fungistatic material therein such as Sulfur and anthracene.

Obviously a composition of matter equivalent in chemical composition and chemical and physical properties could be specifically made from suitable components but obviously the waste product from the plastic industry is ideal for so inexpensive a material as fertilizer.

The coating of this invention is applicable to inorganic and to organic fertilizer granules.

This invention has been described by means of several illustrative embodiments thereof but it is not limited to these embodiments.

I claim:

1. A fungistatic, non-caking, substantially dust free, water leachable fertilizer composition consisting essentially of fertilizer granules coated with a polymerizable styrene resin having a boiling point of between 187° and 300° F. and containing from about two to about twenty percent styrene, and from about twenty to about fifty-five percent polystyrene and from about six to about thirty percent sulfur.

2. The fungistatic fertilizer composition of claim 1 containing about twenty pounds of said resin coating per ton of granules.

References Cited by the Examiner
UNITED STATES PATENTS

| | | | |
|---|---|---|---|
| 2,353,223 | 7/44 | Corkery et al. | 260—669 |
| 2,365,646 | 12/44 | New et al. | 117—168 |
| 2,399,987 | 5/46 | Cordie et al. | 71—64 |
| 2,500,770 | 3/50 | Pierce | 71—64 |
| 2,689,166 | 9/54 | Rust et al. | 71——64 |
| 2,846,431 | 8/58 | Goss | 71—25 |
| 3,014,783 | 12/61 | Young | 71—64 |
| 3,027,249 | 3/62 | Jost | 71—64 |
| 3,034,858 | 5/62 | Vives | 71—64 |
| 3,069,370 | 12/62 | Jensen et al. | 71——64 |
| 3,070,435 | 12/62 | Reusser et al. | 71—64 |

DONALL H. SYLVESTER, *Primary Examiner.*
ANTHONY SCIAMANNA, *Examiner.*